United States Patent
Lin et al.

(10) Patent No.: US 8,561,806 B2
(45) Date of Patent: Oct. 22, 2013

(54) MEASUREMENT APPARATUS AND METHOD THEREOF

(75) Inventors: Dong-Sheng Lin, Taipei Hsien (TW); Tzyy-Chyi Tsai, Taipei Hsien (TW); Jian-Jun Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 900 days.

(21) Appl. No.: 12/609,141

(22) Filed: Oct. 30, 2009

(65) Prior Publication Data
US 2010/0260583 A1 Oct. 14, 2010

(30) Foreign Application Priority Data
Apr. 8, 2009 (CN) .......................... 2009 1 0301385

(51) Int. Cl.
*B07C 5/00* (2006.01)
(52) U.S. Cl.
USPC ............ 209/629; 209/509; 209/606; 209/616
(58) Field of Classification Search
USPC ................... 209/509, 606, 617, 629
See application file for complete search history.

(56) References Cited

U.S. PATENT DOCUMENTS 5,768,759 A * 6/1998 Hudson ...................... 29/407.04
6,640,423 B1 * 11/2003 Johnson et al. ................. 29/740

FOREIGN PATENT DOCUMENTS

CN 101244767 A 8/2008

* cited by examiner

*Primary Examiner* — Terrell Matthews
(74) *Attorney, Agent, or Firm* — Altis & Wispro Law Group, Inc.

(57) ABSTRACT

A measurement apparatus includes a support frame to support a feed mechanism, an orientation mechanism, a measurement mechanism, a transfer mechanism, and an unloading mechanism. The feed mechanism includes a first holding assembly, a first elevation assembly, a second elevation assembly, and a first clipping assembly. The first elevation assembly and the second elevation assembly are positioned under the holding assembly, and the first clipping assembly is positioned over the holding assembly. The measurement mechanism includes a support stage and at least one calibration head. The transfer mechanism includes at least one pickup head. The orientation mechanism includes a driving member and a securing assembly driven by the driving member. The unloading mechanism has the same structure as the feed mechanism. The disclosure further provides a measuring method using the measurement apparatus.

7 Claims, 7 Drawing Sheets

MEASUREMENT APPARATUS AND METHOD THEREOF

BACKGROUND

1. Technical Field

The present disclosure generally relates to a measurement apparatus and method thereof, and more particularly to a measurement apparatus and method applied in manufacturing.

2. Description of Related Art

During manufacture, workpieces must be measured to determine eligibility thereof.

Generally, workpieces are fed to a measurement apparatus one by one, and then removed to different locations according to the measurement results. However, other procedures, such as feeding, marking, recording, unloading, and transferring, usually performed manually, can require considerable time and manpower. Further, errors, such as misplaced workpieces are common in such manual operations.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
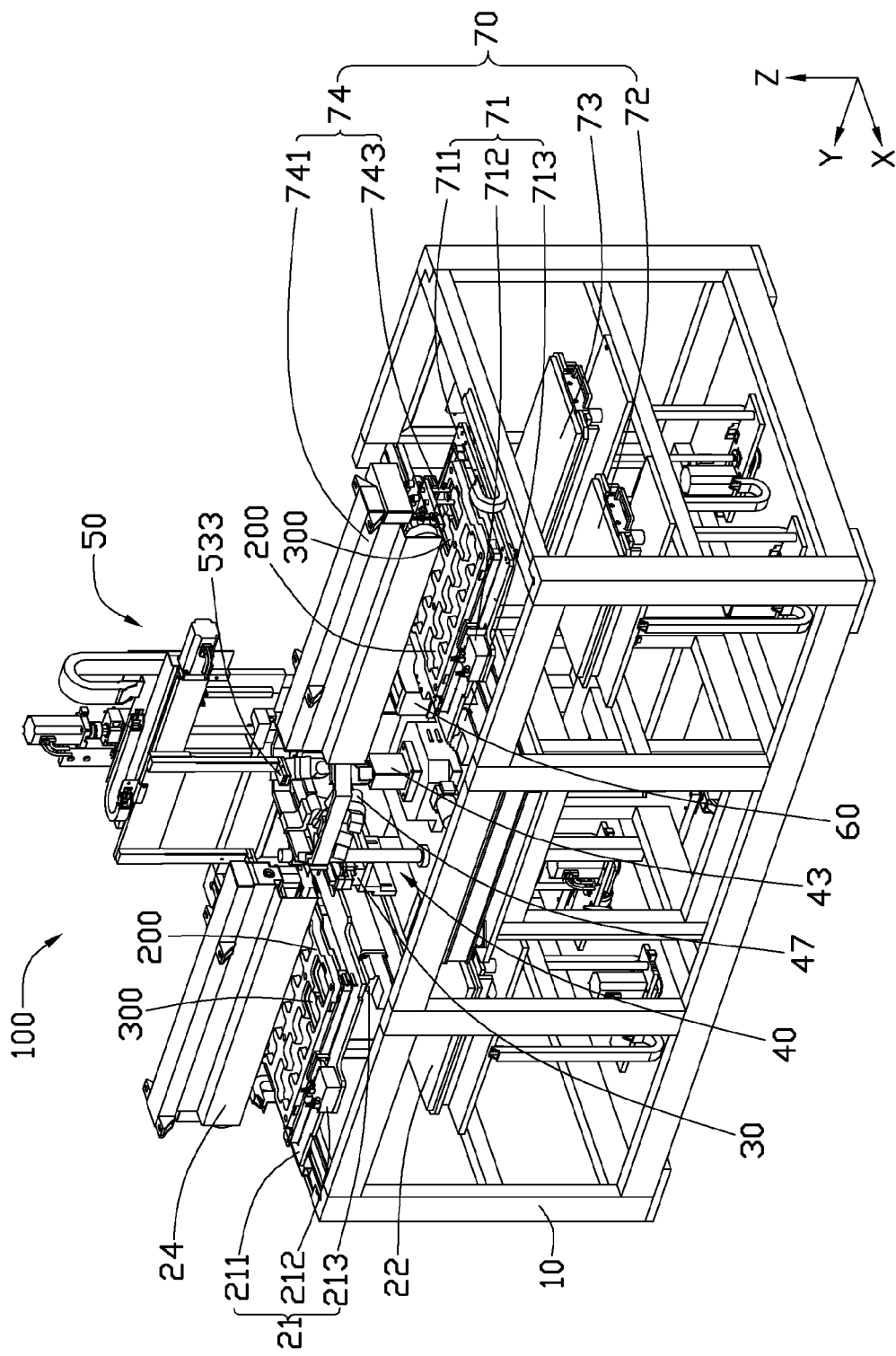
FIG. 1 is an isometric view of an embodiment of a measurement apparatus with workpieces installed therein.
Figure 2:
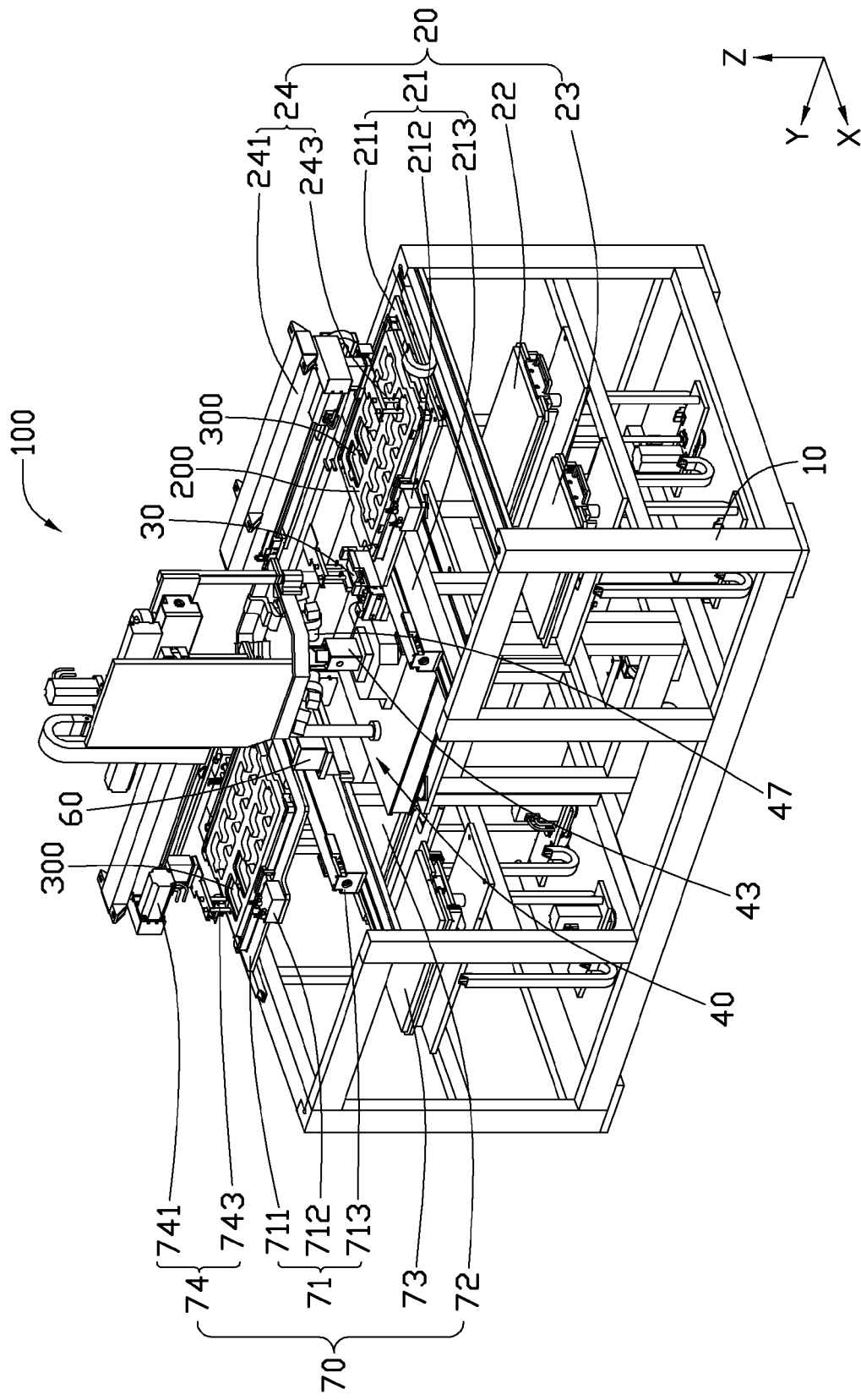
FIG. 2 is similar to FIG. 1, but viewed from another aspect.

Referring to FIG. 1 and FIG. 2, a measurement apparatus 100 includes a support frame 10, a feed mechanism 20, an orientation mechanism 30, a measurement mechanism 40, a transfer mechanism 50, a storage mechanism 60, and an unloading mechanism 70.

The measurement mechanism 40 is supported by and positioned in the middle of the support frame 10. The transfer mechanism 50 is mounted on the support frame 10 and positioned over the measurement mechanism 40. The feed mechanism 20 and the unloading mechanism 70 are mounted on the support frame 10 and positioned on two sides of the measurement mechanism 40. The orientation mechanism 30 is mounted on the support frame 10 and positioned between the feed mechanism 20 and the measurement mechanism 40, and the storage mechanism 60 is mounted on the support frame 10 and positioned between the unloading mechanism 70 and the measurement mechanism 40. The measurement apparatus 100 further includes a control system (not shown) to direct operation of the feed mechanism 20, the orientation mechanism 30, the measurement mechanism 40, the transfer mechanism 50, the storage mechanism 60, and the unloading mechanism 70. The feed mechanism 20 and the unloading mechanism 70 may be positioned adjacent to the measurement mechanism 40, such as on the same side thereof, with the orientating mechanism 30 and the storage mechanism 60 correspondingly positioned on the same side of the measurement mechanism 40, but adjacent to the feed mechanism 20 and the unloading mechanism 70 respectively.

The support frame 10 includes a plurality of bars connecting with each other.

The feed mechanism 20 includes a first holding assembly 21, a first elevation assembly 22, a second elevation assembly 23, and a first clipping assembly 24. The first holding assembly 21 is positioned at the same level as the measurement mechanism 40. The first elevation assembly 22 and the second elevating mechanism 23 are positioned under the first holding assembly 21. The first clipping assembly 24 is positioned over the first holding assembly 21. The feed mechanism 20 supports trays 200, either empty or loaded with workpieces 300. The workpieces 300 are casings in the illustrated embodiment (referring to FIG. 3).

The first holding assembly 21 includes a first holding frame 211 which is rectangular, two first pneumatic cylinders 212 mounted on the first holding frame 211, and a first sliding rail 213 mounted on the support frame 10.

The first elevation assembly 22 supports the trays 200 loaded with the workpieces 300, and the second elevation assembly 23 supports empty trays 200. The first elevation assembly 22 and the second elevation assembly 23 move along the Z-axis driven by pneumatic cylinders (not labeled).

The first clipping assembly 24 is mounted on the support frame 10. The first clipping assembly 24 includes a first stabilization member 241 and a first claw 243 slidably positioned on the first stabilization member 241. The first claw 243 moves between the feed mechanism 20 and the orientation mechanism 30 and moves the workpieces 300 from the feed mechanism 20 to the orientation mechanism 30.

Figure 3:
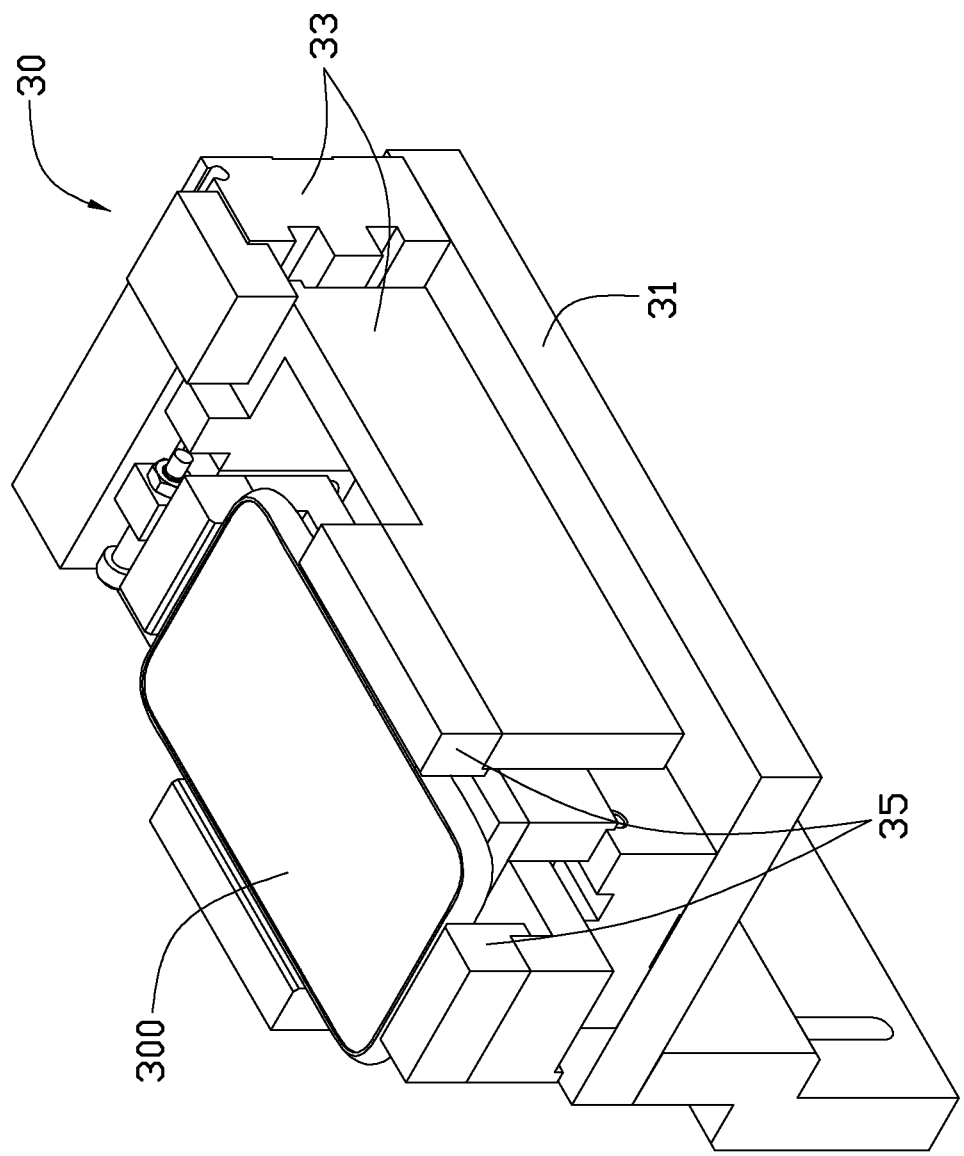
FIG. 3 is an isometric view of an orientation mechanism of the measurement apparatus in FIG. 1.

Referring to FIG. 2 and FIG. 3, the orientation mechanism 30 includes a first support member 31, a driving member 33, and a securing assembly 35. The first support member 31 is positioned on the support frame 10. The securing assembly 35 includes a plurality of blocks. When the workpiece 300 is placed on the orientation mechanism 30, the driving member 33 drives the securing assembly 35 to securely fix the workpiece 300. In the illustrated embodiment, the driving member 33 is a pneumatic cylinder, but may be another driving member, such as an electromotor, or a hydraulic cylinder, for example.

Figure 4:
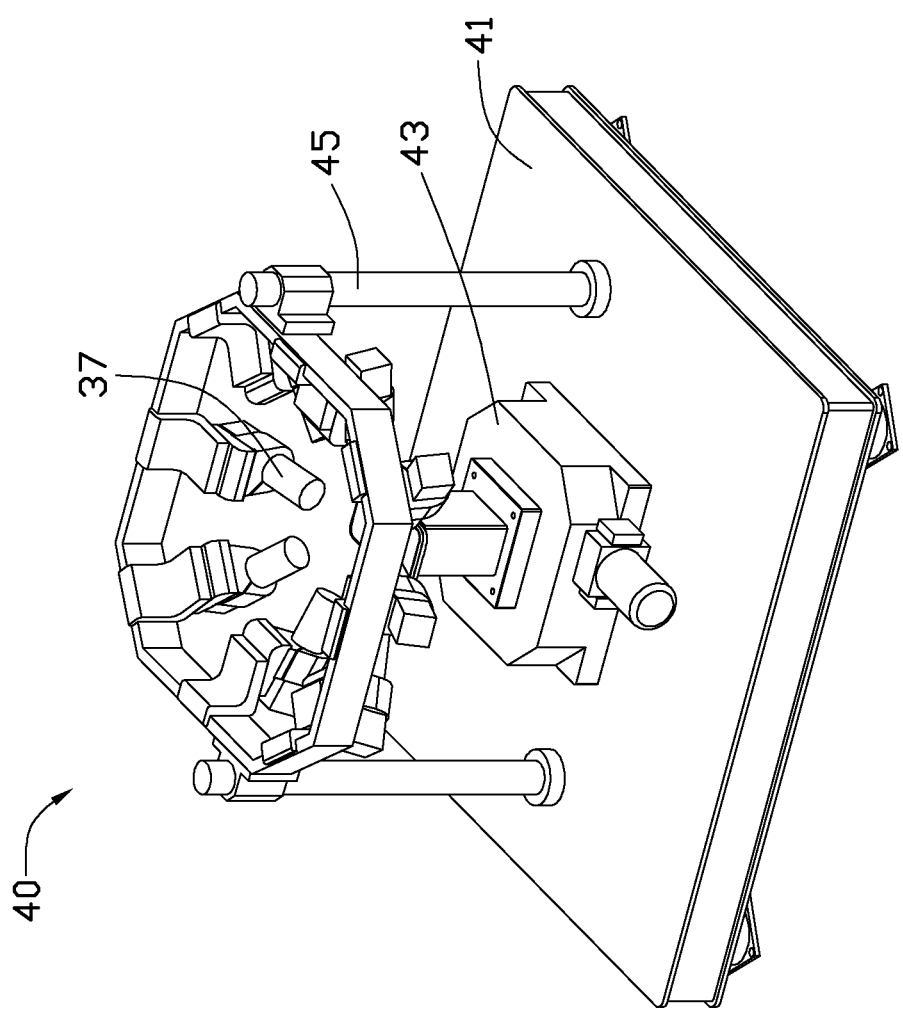
FIG. 4 is an isometric view of a measurement mechanism of the measurement apparatus in FIG. 1.

Referring to FIG. 1 and FIG. 4, the measurement mechanism 40 includes a support base 41, a support stage 43, a support bracket 45, and a plurality of calibration heads 47. The support base 41 is mounted on the support frame 10. The support stage 43 and the support bracket 45 are mounted on and supported by the support base 41. The calibration heads 47 target the support stage 43 such that the support stage 43 is in the calibration range thereof. The calibration heads 47 may be a CCD (charge coupled device) or LED (light emitting diode) heads, for example. The number of the calibration head 47 may be only one.

Figure 5:
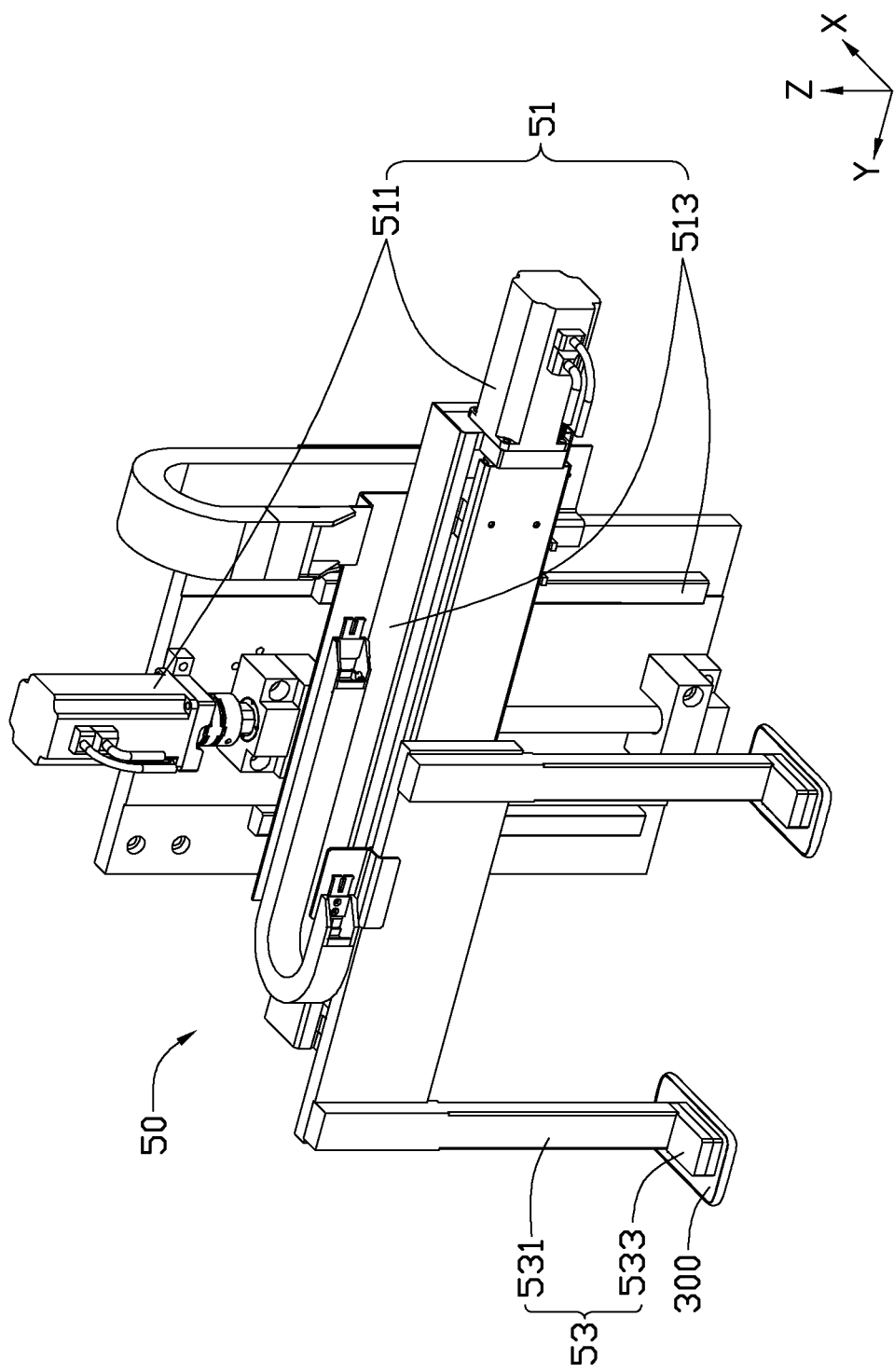
FIG. 5 is an isometric view of a transfer mechanism of the measurement apparatus in FIG. 1.

Referring to FIG. 1 and FIG. 5, the transfer mechanism 50 includes a transfer assembly 51 and a retrieval assembly 53 slidably connected on the transfer assembly 51. The transfer assembly 51 includes a plurality of driving members 511 and a plurality of rails 513 extending along the Y and Z axes of the support frame 10. The retrieval assembly 53 includes two connecting shafts 531 and two pickup heads 533 mounted on a distal end of each connecting shaft 531. The connecting shafts 531 are slidably connected on a rail 513 extending along the Y-axis, such that the retrieval assembly 53 can slide on the Y and Z axes driven by the driving members 511. The pickup heads 533 retrieve the workpieces 300, such that the transfer mechanism 50 can transfer the workpiece 300 from the orientation mechanism 30 to the measurement mechanism 40 or from the measurement mechanism 40 to the storage mechanism 60. The number of pickup heads 533 may be only one.

Figure 6:
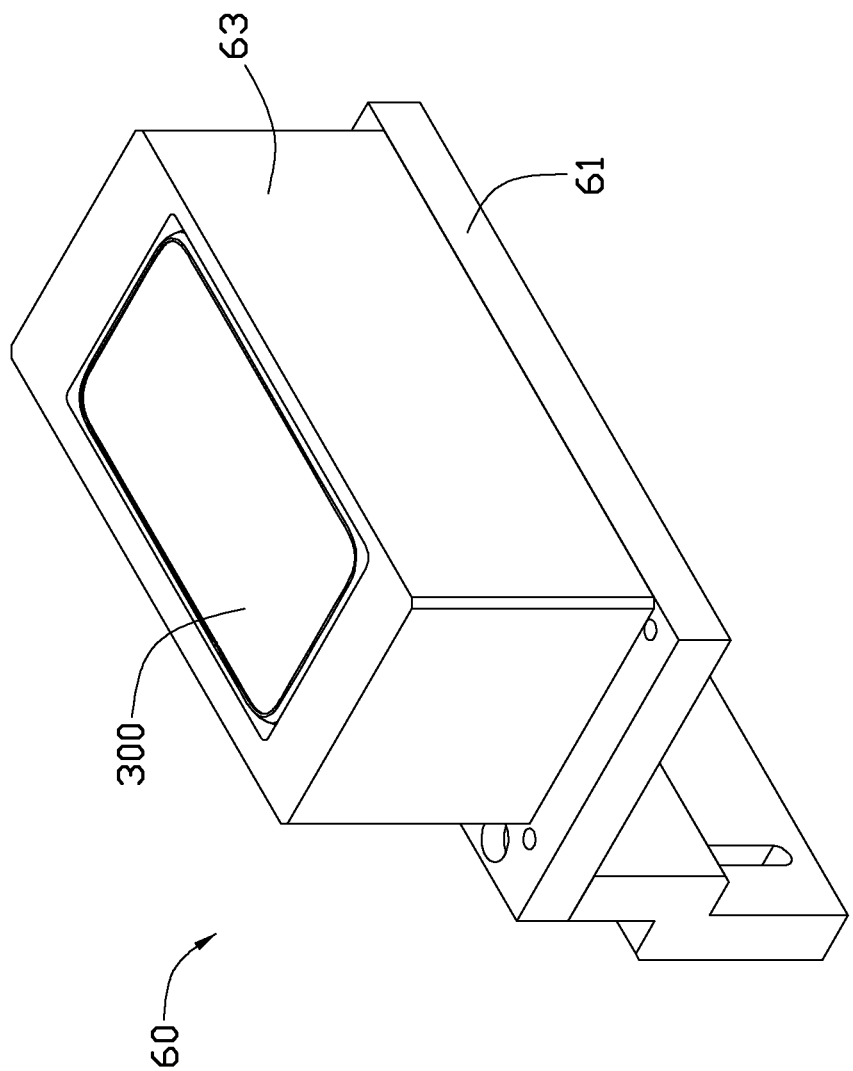
FIG. 6 is an isometric view of a storage mechanism of the measurement apparatus in FIG. 1.

Referring to FIG. 1 and FIG. 6, the storage mechanism 60 includes a second support member 61 and a receiving stage 63 mounted on the support member 61. The workpieces 300 are received in the receiving stage 63.

Referring to FIG. 1 and FIG. 2, the unloading mechanism 70 has the same structure and function as the feed mechanism 20. The unloading mechanism 70 includes a second holding assembly 71, a third elevation assembly 72, a fourth elevation assembly 73, and a second clipping assembly 74. The third elevation assembly 72 and the fourth elevation assembly 73 are positioned under the second holding assembly 71. The second clipping assembly 74 is positioned over the second holding assembly 71. The unloading mechanism 70 supports trays 200.

The second holding assembly 71 includes a second holding frame 711 which is rectangular, a second pneumatic cylinder 712 mounted on the second holding frame 711, and a second sliding rail 713 mounted on the support frame 10.

The third elevation assembly 72 supports the empty trays 200, and the fourth elevation assembly 73 supports the trays 200 loaded with the workpieces 300. The third elevation assembly 72 and the fourth elevation assembly 73 move along the Z-axis driven by the pneumatic cylinders (not labeled).

The second clipping assembly 74 includes a second stabilization member 741 and a second claw 743 slidably positioned on the second stabilization member 741. The second claw 743 moves between the unloading mechanism 70 and the storage mechanism 60.

Figure 7:
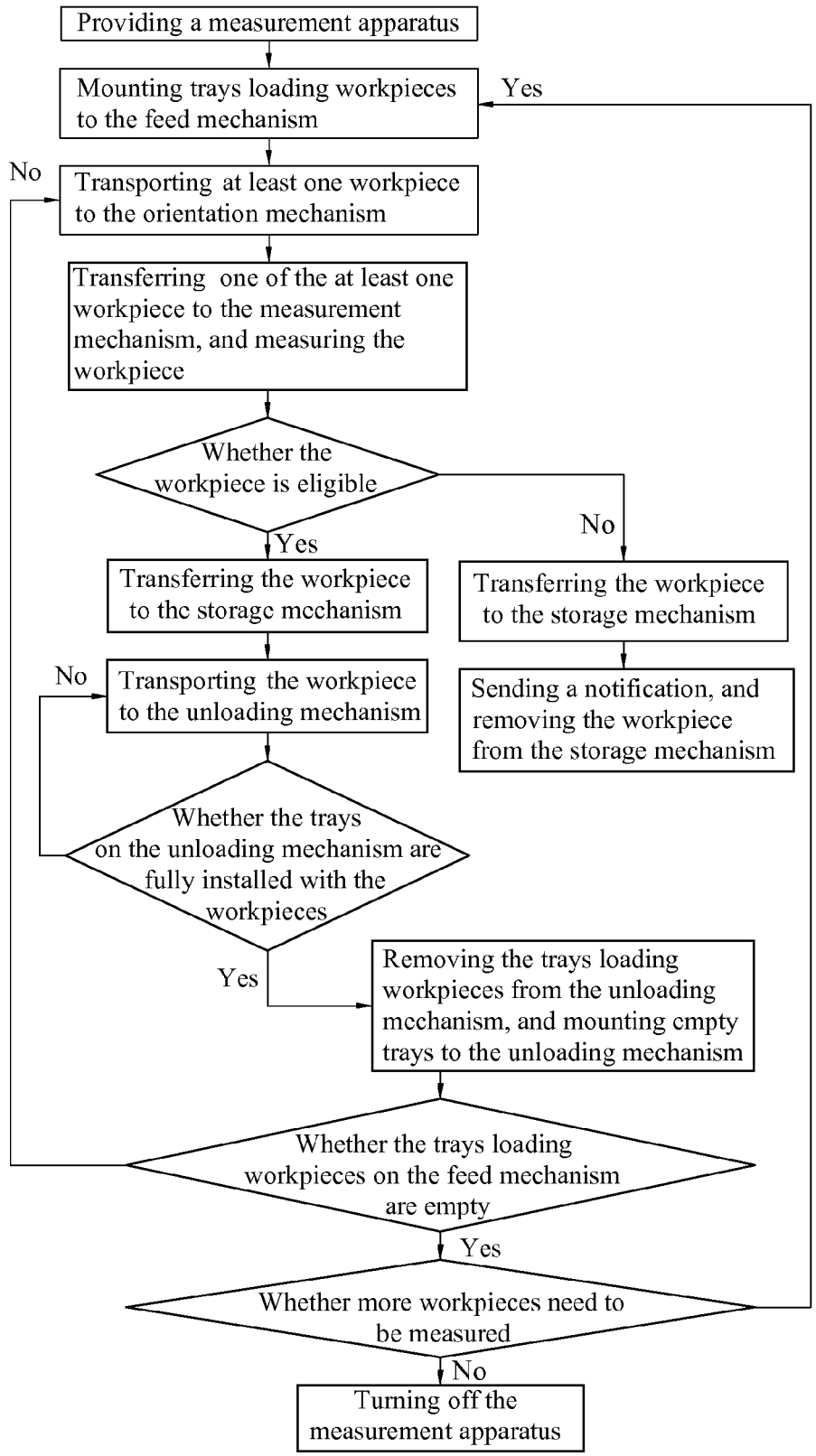
FIG. 7 is a flowchart of an exemplary measuring method using a measurement apparatus such as, for example, that of FIG. 1.

FIG. 7 shows a method of measuring the workpieces 300 applying a measurement apparatus such as, for example, that of FIG. 1, as follows.

Trays 200 loaded with the workpieces 300 are mounted on a first elevation assembly 22 of a feed mechanism 20, which elevates the trays 200 to the first holding assembly 21 along the Z-axis of the support frame 10. The first pneumatic cylinders 212 of the first holding assembly 21 clip one tray 200 and the first elevation assembly 22 moves downwards simultaneously. The first claw 243 of the first clipping assembly 24 retrieves one workpiece 300 from the tray 200, moves along the Y-axis of the support frame 10 relative to the first stabilization member 241, and the workpiece 300 is placed on the orientation mechanism 30. When the workpieces 300 in a same row are removed from the tray 200 by the first claw 243, the tray 200 is directed to move along the first slide rail 213 of the holding assembly 21 for a predetermined distance. As such, after all the workpieces 300 in the tray 200 are removed, the empty tray 200 is aligned with the second elevation assembly 23. The second elevation assembly 23 elevates along the Z-axis of the support frame 10 in preparation to support the empty tray 200. The pneumatic cylinders 212 release the empty tray 200, and the second elevation assembly 23 supports the empty tray 200 and moves downwards.

When one of the workpieces 300 retrieved by the clipping assembly 24 is moved to the orientation mechanism 30 and positioned between the blocks of the securing assembly 35, driving member 33 drives the blocks of the securing assembly 35 to retrieve the workpiece 300 from different directions, such that the blocks of the securing assembly 35 may impel the workpiece into a precise position between the blocks of the securing assembly 35.

The workpiece 300 released by the securing assembly 35 is retrieved by the pickup head 433 from the orientation mechanism 30 and transferred to the measurement mechanism 40. The workpiece 300 is positioned on the support stage 43 of the measurement mechanism 40, and measured by the calibration heads 47. The measurement mechanism 40 records and sends the result to the control system, and the control system determines if the workpiece 300 is eligible.

If the workpiece 300 is eligible, the workpiece 300 is transferred to the storage mechanism 50 and further moved by the second claw 743 to the trays 200 on the unloading mechanism 70. If the workpiece 300 is ineligible, after the workpiece 300 is transferred to the storage mechanism 50, the control system of the measurement apparatus 100 sends a notification to remove the workpiece 300 from the storage mechanism 50 to a location storing the ineligible workpieces 300.

Trays 200 on the unloading mechanism 70 full of the workpieces 300 are moved and mounting empty trays 200 replace them. If the trays 200 on the unloading mechanism 70 are not full, movement of the workpieces 300 to the unloading mechanism 70 is repeated.

If the trays 200 on the feed mechanism 20 are empty, determination of whether more of the workpieces 300 need to be measured continues. If more of the workpieces 300 need to be measured, mounting trays 200 loaded with workpieces 300 are again brought to the feed mechanism 20, and if more of the workpieces 300 need not to be measured, measurement apparatus 100 is shut down.

The measurement apparatus as disclosed measures workpieces, transporting, transferring, orientating, measuring the workpieces, and determining whether the workpieces eligible, such that manual requirements in the process are limited, and time for delivery and removal of the workpieces to the unloading mechanism is increased. In addition to reduce manpower requirements and increased efficiency, measurement apparatus breakdown incidence is reduced, with efficiency thus further improved.

The orientation mechanism may adjust workpieces, which can then be retrieved by the transfer mechanism exactly.

Alternatively, the storage mechanism may be omitted with the workpieces moved to the unloading mechanism directly. If a workpiece is ineligible, the control system sends a notification immediately after the workpiece is moved to the unloading mechanism to prompt removal of the workpiece.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A measurement apparatus, comprising:
 a support frame;
 a feed mechanism mounted on the support frame to support at least one tray loading at least one workpiece, the feed mechanism comprising a first holding assembly, a first elevation assembly, a second elevation assembly, and a first clipping assembly, the first elevation assembly and the second elevation assembly positioned under the first holding assembly, the first clipping assembly positioned over the first holding assembly, the first elevation assembly elevating the at least one tray loading the at least one workpiece to the first holding assembly, and the second elevation assembly supporting at least one empty tray away from the first holding assembly;
a measurement mechanism mounted on the support frame comprising a support stage and at least one calibration head;
an orientation mechanism positioned between the feed mechanism and the measurement mechanism comprising a driving member driving a securing assembly;
a transfer mechanism mounted on the support frame comprising at least one pickup head; and
an unloading mechanism mounted on the support frame comprising a second holding assembly, a third elevation assembly, a fourth elevation assembly, and a second clipping assembly, the third elevation assembly and the fourth elevation assembly positioned under the second holding assembly, the second clipping assembly positioned over the second holding assembly, the third elevation assembly elevating at least one empty tray to the second holding assembly, and the fourth elevation assembly supporting at least one tray loading the at least one workpiece away from the second holding assembly;
wherein the feed mechanism and the unloading mechanism are positioned adjacent to the measurement mechanism, the first clipping assembly is capable of transporting the at least one workpiece on the feed mechanism to the orientation mechanism, and the at least one pickup head of the transfer mechanism is capable of transporting the at least one workpiece to the measurement mechanism from the orientation mechanism or to the unloading mechanism from the measurement mechanism.

2. The measurement apparatus of claim 1, wherein the transfer mechanism is positioned over the measurement mechanism, and the feed mechanism and the unloading mechanism are positioned on two opposite sides of the measurement mechanism, and wherein the transfer mechanism is capable of movement in a range adjacent to the measurement mechanism.

3. The measurement apparatus of claim 1, wherein the unloading mechanism comprises a second holding assembly, a third elevation assembly, a fourth elevation assembly, and a second clipping assembly, the third elevation assembly and the fourth elevation assembly positioned under the second holding assembly, and the second clipping assembly positioned over the second holding assembly.

4. The measurement apparatus of claim 3 further comprising a storage mechanism positioned between the measurement mechanism and the unloading mechanism, wherein the second clipping mechanism of the unloading mechanism is capable of movement between the storage mechanism and the unloading mechanism.

5. The measurement apparatus of claim 3, wherein the second clipping assembly comprises a second stabilization member and a second claw slidably connected to the second stabilization member, the second claw is capable of movement over the second holding assembly.

6. The measurement apparatus of claim 1, wherein the first elevation assembly and the second elevation assembly are capable of elevating or lowering; and the first clipping assembly comprises a first stabilization member and a first claw slidably connected to the first stabilization member.

7. The measurement apparatus of claim 1, wherein the transfer mechanism further comprises at least one driving member, a plurality of rails extending along different axes, and at least one connecting shaft, the at least one pickup head mounted on the at least one connecting shaft, and the at least one connecting shaft capable of sliding relative to the rails.

* * * * *